(12) United States Patent
Zhou et al.

(10) Patent No.: US 12,294,095 B2
(45) Date of Patent: May 6, 2025

(54) JET PRINTING PROCESS FOR PROTECTIVE LAYER OF UPPER COVER OF LITHIUM BATTERY

(71) Applicant: GUANGDONG CLIMAX SMARTECH CO., LTD, Zhuhai (CN)

(72) Inventors: Zhenxing Zhou, Dongguan (CN); Wancheng Zhou, Dongguan (CN)

(73) Assignee: GUANGDONG CLIMAX SMARTECH CO., LTD, Zhuhai (CN)

( * ) Notice: Subject to any disclaimer, the term of this patent is extended or adjusted under 35 U.S.C. 154(b) by 0 days.

(21) Appl. No.: 18/956,280

(22) Filed: Nov. 22, 2024

(65) Prior Publication Data

US 2025/0087796 A1   Mar. 13, 2025

Related U.S. Application Data

(63) Continuation of application No. PCT/CN2022/110541, filed on Aug. 5, 2022.

(51) Int. Cl.
*H01M 50/155* (2021.01)
*B41J 29/13* (2006.01)

(52) U.S. Cl.
CPC ........... *H01M 50/155* (2021.01); *B41J 29/13* (2013.01)

(58) Field of Classification Search
CPC .............................. H01M 50/155; B41J 29/13
See application file for complete search history.

(56) References Cited

U.S. PATENT DOCUMENTS

| | | |
|---|---|---|
| 2014/0272322 A1 | 9/2014 | Lee |
| 2015/0306621 A1 | 10/2015 | Chan |
| 2018/0182721 A1 | 6/2018 | Gai |
| 2019/0161844 A1 | 5/2019 | Hanson |

FOREIGN PATENT DOCUMENTS

| | | |
|---|---|---|
| CN | 2548720 | 5/2003 |
| CN | 104801457 A | 7/2015 |
| CN | 214766327 U | 11/2021 |
| CN | 214917257 U | 11/2021 |
| CN | 215694994 U | 2/2022 |
| EP | 2995383 A1 | 3/2016 |
| JP | 2002268071 B2 | 9/2002 |
| JP | 2003117450 A | 4/2003 |
| JP | 2017179495 B2 | 10/2017 |

OTHER PUBLICATIONS

James E. Duffy "I-CAR Professional Automotive Collision Repair" Nov. 30, 1998(Nov. 30, 1998), pp. 245-247.

*Primary Examiner* — Jane J Rhee
(74) *Attorney, Agent, or Firm* — JEEN IP LAW, LLC

(57) ABSTRACT

The present invention discloses a jet printing process for a protective layer of an upper cover of a lithium battery, a jet printing region is divided into a first jet printing region and a second jet printing region and is combined with a flying ink blocking plate having a hollowed-out jet printing window, such that flying ink can be prevented from splashing onto non-jet printed areas such as a positive and negative electrodes, a liquid injection hole, a two-dimensional code area of the upper cover of lithium battery during jet printing at a position which requires ink jet printing.

6 Claims, 6 Drawing Sheets

JET PRINTING PROCESS FOR PROTECTIVE LAYER OF UPPER COVER OF LITHIUM BATTERY

CROSS-REFERENCE TO RELATED APPLICATIONS

This application is a continuation of International Application No. PCT/CN2022/110541, filed on Aug. 5, 2022, which claims priority to Chinese Patent Application No. 202210580717.2, filed with the China National Intellectual Property Administration on May 26, 2022, both of which are hereby incorporated by reference in their entireties.

TECHNICAL FIELD

The present invention relates to a jet printing process, particularly to a jet printing process for protective layer of upper cover of lithium battery.

BACKGROUND

The upper cover of lithium battery is provided with areas that cannot be jet printed with ink, such as the positive and negative electrode area, liquid injection hole area, and two-dimensional code area, therefore jet printing must be performed away from these areas; However, during jet printing, the nozzle may splash ink (commonly known as flying ink), and the direct use of jet printing to form the protective film will inevitably splash some ink onto these areas, causing processing defects and even affecting the quality of lithium battery. Therefore, it is necessary to design a jet printing process for the protective layer of upper cover of lithium battery, such that flying ink can be prevented from splashing onto non jet printed areas such as the positive and negative electrode, liquid injection hole, and two-dimensional code area of upper cover of lithium battery during jet printing at a position which requires ink jet printing.

SUMMARY

In view of above shortcomings, the purpose of the present invention is to provide a jet printing process for a protective layer of an upper cover of a lithium battery, a jet printing region is divided into a first jet printing region and a second jet printing region and is combined with a flying ink blocking plate having a hollowed-out jet printing window, such that flying ink can be prevented from splashing onto non-jet printed areas such as a positive and negative electrodes, a liquid injection hole, a two-dimensional code area of the upper cover of the lithium battery during jet printing at a position which requires ink jet printing.

The technical solution adopted by the present invention: a jet printing process for protective layer of upper cover of lithium battery, including the upper cover of lithium battery to be jet printed, the upper cover end face of lithium battery has a width of W and a length of L, and the upper cover end face of lithium battery is provided with a non jet printing portion, the distance between the lower side of upper cover end face and the lower side of non jet printing portion is H, and the distance between the upper side of upper cover end face of lithium battery and the upper side of non jet printing portion is also H, comprising the following steps:

1) dividing the jet printing region on the upper cover end face of lithium battery into a first jet printing region and a second jet printing region, wherein the first jet printing region is a square area between the lower side of the upper cover end face of lithium battery and the lower side of the non jet printing portion, the square area is L in length and H in width and, except for the first jet printing region, the remaining area of jet printing region is the second jet printing region;

2) deploying a flying ink blocking plate, wherein the flying ink blocking plate is provided with a W+0.1~1 mm wide and L long hollowed-out jet printing window that is adapted in shape to the upper cover end face of lithium battery, the flying ink blocking plate is provided with a flying ink blocking block corresponding to the non jet printing portion of upper cover of lithium battery, the flying ink blocking block protrudes from the lower side of jet printing window into the jet printing window, and maintains a gap, H+0.1~1 mm wide, with the upper side of jet printing window, a first jet printing window corresponding to the first jet printing region is formed between the upper side of jet printing window and the upper edge of flying ink blocking block, the jet printing window is a square region with a length of L and a width of H+0.1~1 mm, and except for the first jet printing window, the remaining area of jet printing window is the second jet printing window;

3) placing the flying ink blocking plate above the upper cover end face of lithium battery, and align the upper side of jet printing window with the lower side of non jet printing portion, so that the first jet printing window of flying ink blocking plate corresponds to the first jet printing region of upper cover end face of lithium battery, and the first jet printing window is 0.1-1 mm wider than the first jet printing region (that is, the edge of ink blocking block will be lower than the lower side of upper cover end face of lithium battery, such that the rounded transition position of the lower edge of upper cover end face of lithium battery is fully jet printed, avoiding omission at the corner transition); the first jet printing region of the upper cover end face of lithium battery is jet printed;

4) after completing jet printing on the first jet printing region of the upper cover end face of lithium battery, move the ink blocking plate so that the upper edge of ink blocking block aligns with the upper side of non jet printing portion, and the second jet printing window of ink blocking plate corresponds to the second jet printing region on the upper cover end face of lithium battery, and the second jet printing window is 0.1-1 mm wider than the second jet printing region (that is, the upper side of jet printing window will be higher than the upper side of upper cover end face of lithium battery, such that the rounded transition position of the upper edge of upper cover end face of lithium battery is fully jet printed, avoiding omission at the corner transition); the second jet printing region of the upper cover end face of lithium battery is jet printed.

In further, two or more non jet printing portions are spaced apart on the upper cover end face of lithium battery, and the flying ink blocking plate is also provided with two or more flying ink blocking blocks that are spaced apart corresponding to the non jet printing portions on the upper cover of lithium battery.

In further, five non jet printing portions are spaced apart on the upper cover end face of lithium battery, namely positive electrode area, liquid injection hole area, central area, two-dimensional code area, and negative electrode area; the flying ink blocking plate is also provided with five flying ink blocking blocks that are spaced apart corresponding to the non jet printing portions of the upper cover of lithium battery, namely the positive electrode flying ink blocking block, liquid injection hole flying ink blocking block, central flying ink blocking block, two-dimensional code flying ink blocking block, and negative electrode flying ink blocking block.

In further, the non jet printing portion on the upper cover end face of lithium battery is a flat non jet printing portion, a protruding non jet printing portion, or a recessed non jet printing portion.

In further, the flying ink blocking block has a square structure.

In further, in step 2), the length of jet printing window is L+0.1~1 mm, and the length of the first jet printing window is L+0.1~1 mm; In step 3), a slight gap is provided between the left side of the first jet printing window and the left side of the first jet printing region, and a slight gap is provided between the right side of the first jet printing window and the right side of the first jet printing region and, on the overall, the first jet printing window is 0.1-1 mm longer than the first jet printing region; In step 4), a slight gap is provided on the left side of the second jet printing window relative to the left side of the second jet printing region, and a slight gap is provided on the right side of the second jet printing window relative to the right side of the second jet printing region and, on the overall, the second jet printing window is 0.1-1 mm longer than the second jet printing region.

The present invention has the following advantages: a jet printing region is divided into a first jet printing region and a second jet printing region and is combined with a flying ink blocking plate having a hollowed-out jet printing window, such that flying ink can be prevented from splashing onto non-jet printed areas such as a positive and negative electrodes, a liquid injection hole, a two-dimensional code area of the upper cover of the lithium battery during jet printing at a position which requires ink jet printing. The jet printing window of flying ink plate is slightly wider than the upper cover end face of lithium battery, and combined with the flying ink blocking block, the jet printing window is specifically divided into a first jet printing window and a second jet printing window: when the first jet printing region is being jet printed, the more reserved width allows better jet printing coverage at the corner transition on the lower side of upper cover end face of lithium battery; when the second jet printing region is being jet printed, the flying ink blocking block can effectively block the non jet printing portion, and the more reserved width allows better jet printing coverage at the corner transition on the lower side of upper cover end face of lithium battery. The transitions on the upper and lower sides of upper cover end face of lithium battery have rounded corners, and whether they are fully jet printed affects the overall printing quality of lithium battery. In the present invention patent, a specially designed flying ink plate provides process optimization, which not only prevents flying ink splashing onto non jet printing portions, but also ensures the sufficient jet printing at rounded transitions on the upper and lower sides of the upper cover end face of lithium battery.

The present invention is further elaborated below in conjunction with the accompanying drawings and specific embodiments.

Figure 1:
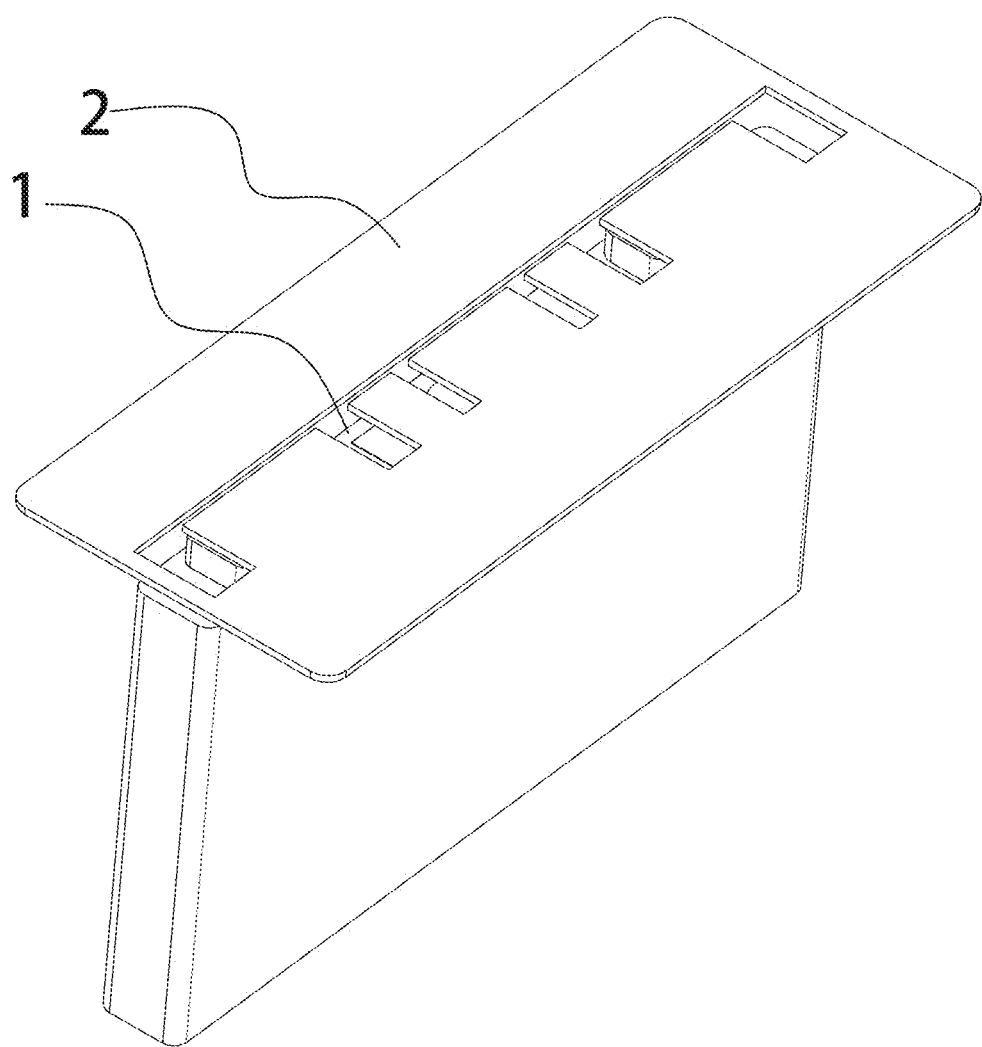
FIG. 1 is an overall schematic diagram of the structure of this embodiment.

Where: upper cover of lithium battery 1; Positive electrode area 11; liquid injection hole area 12; central area 13; two-dimensional code area 14; negative electrode area 15; transition corner 16; first jet printing region 17; second jet printing region 18; flying ink plate 2; jet printing window 21; flying ink blocking block 22; gap 23.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

Figure 2:
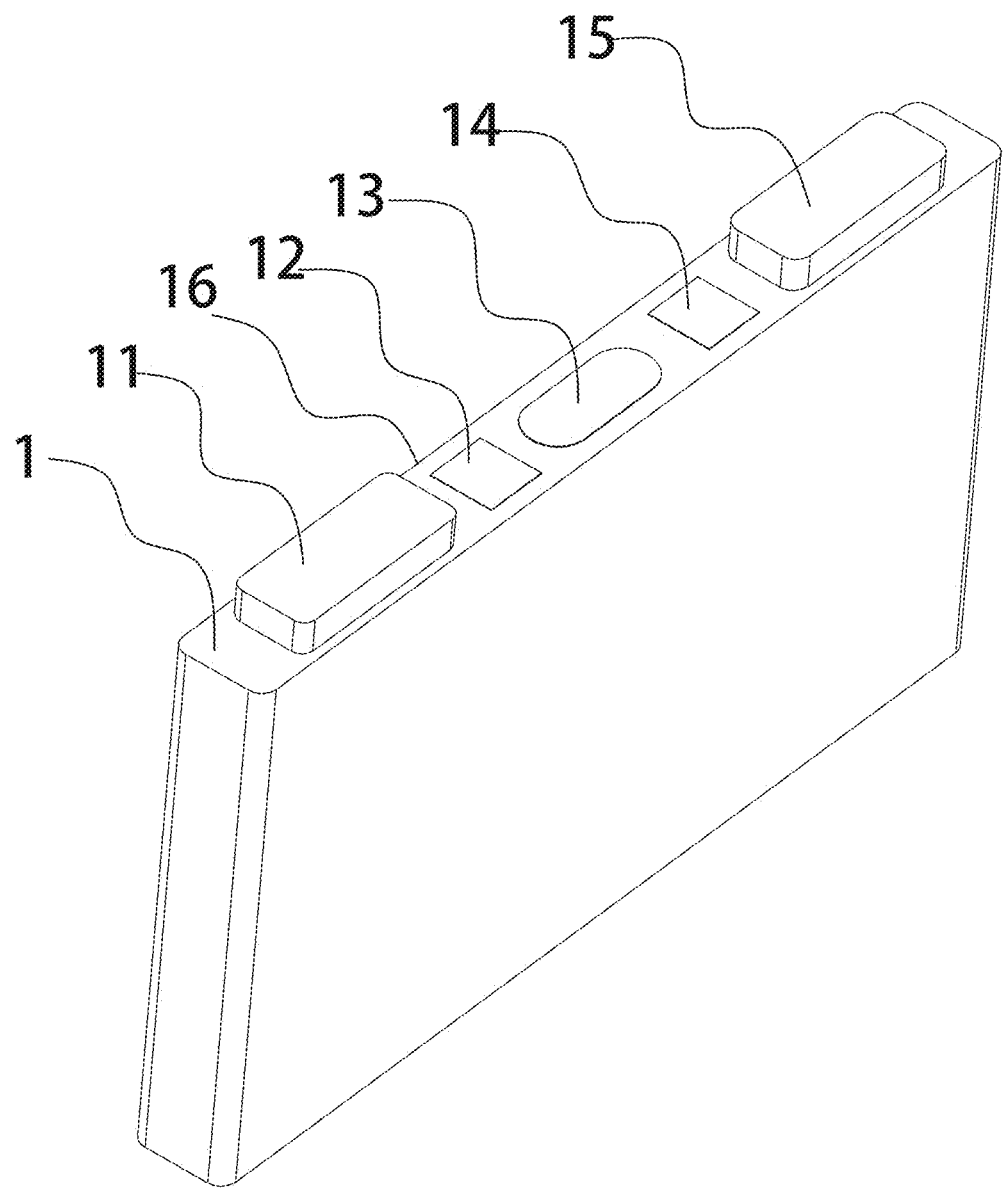
FIG. 2 is a structure diagram of the upper cover of lithium battery.
Figure 3:
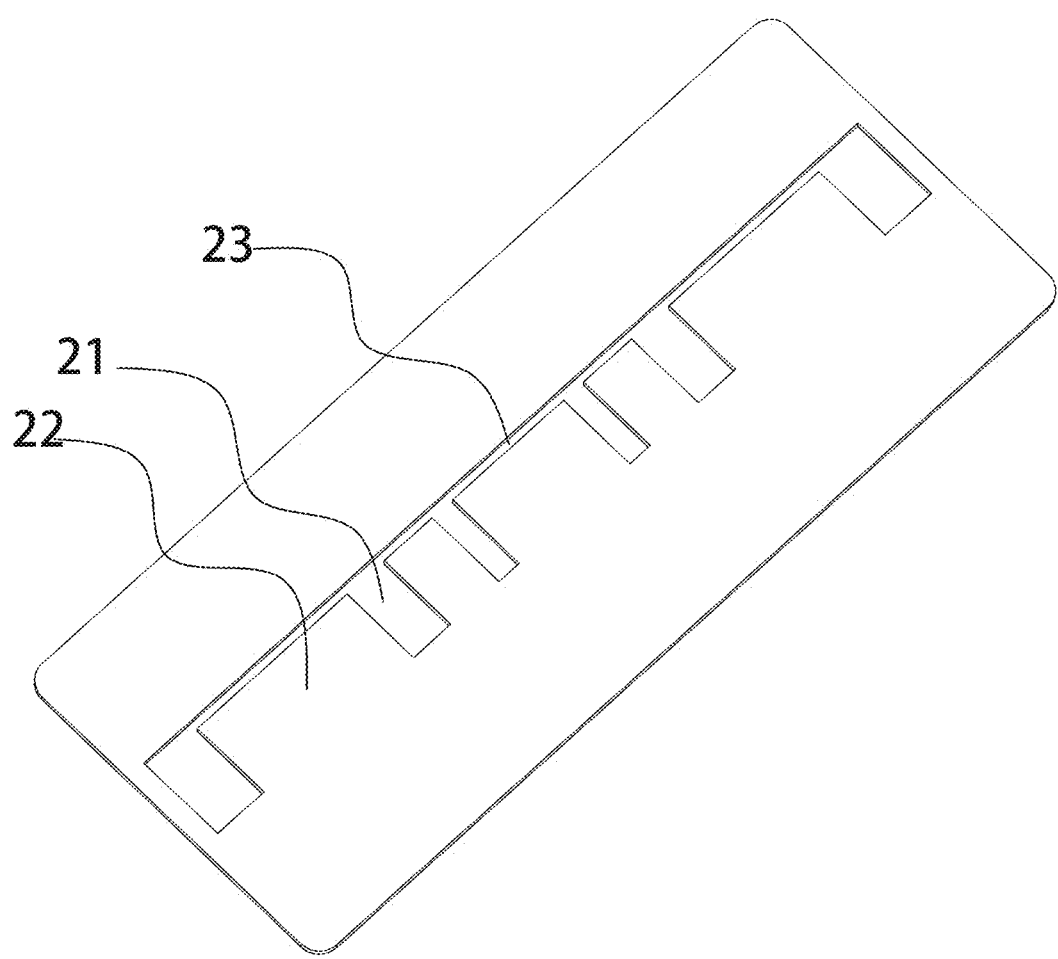
FIG. 3 is a structure diagram of the flying ink plate.
Figure 4:
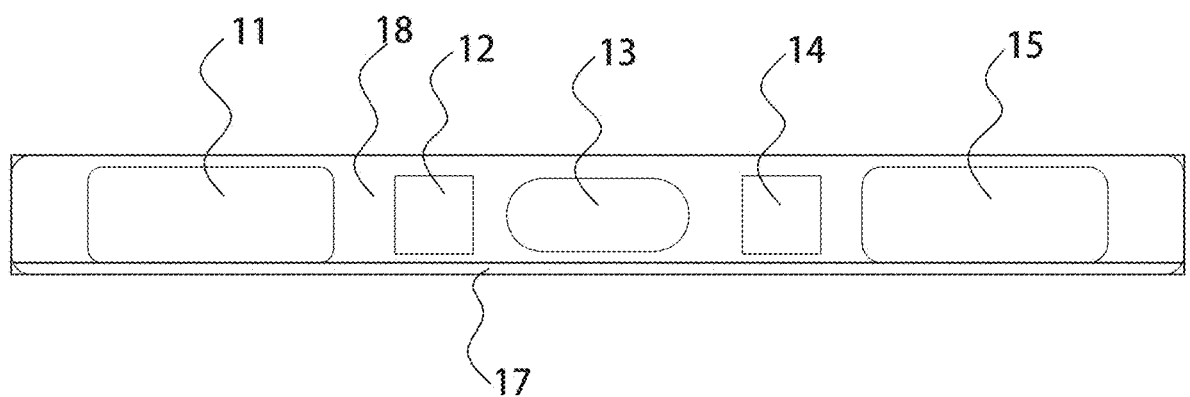
FIG. 4 is a schematic diagram of the division of jet printing region on the upper cover end face of lithium battery.
Figure 5:
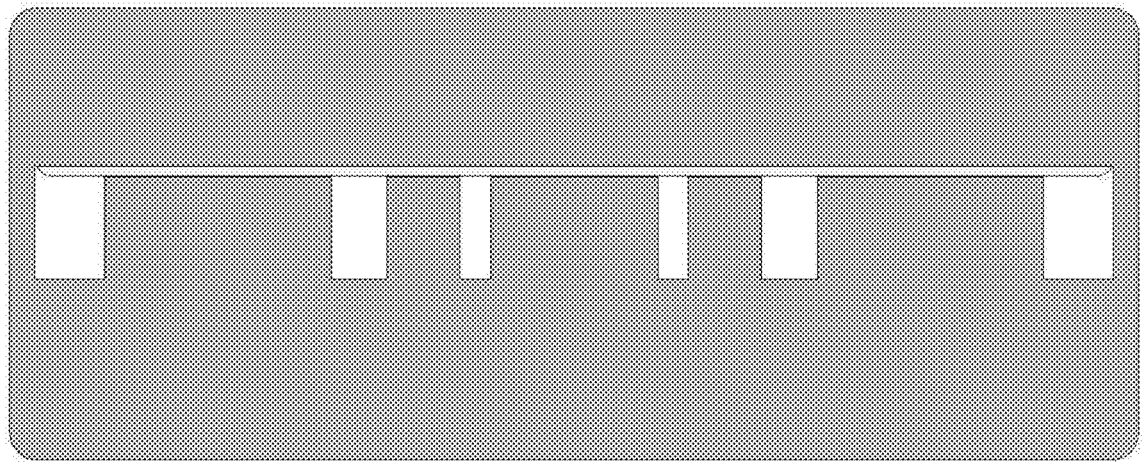
FIG. 5 is a schematic diagram of the first jet printing region.
Figure 6:
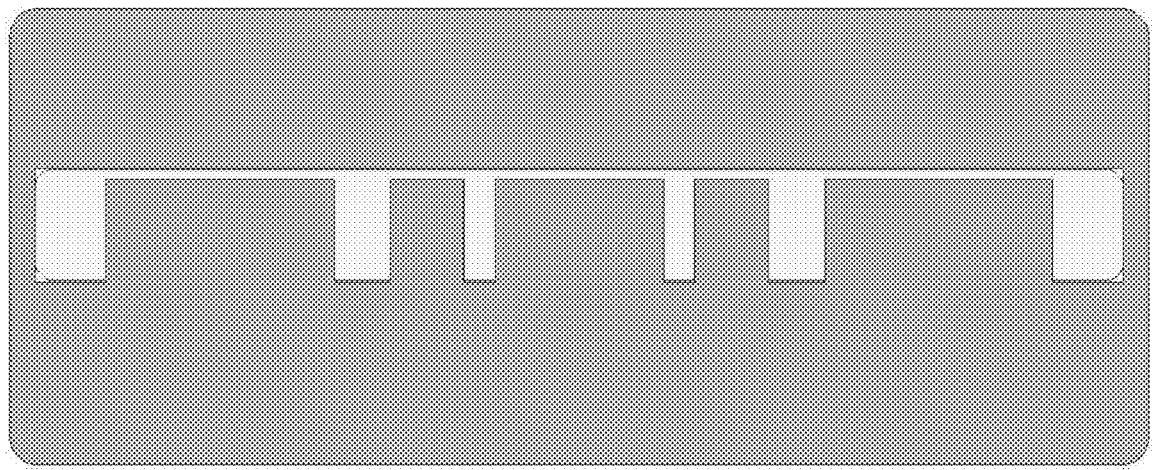
FIG. 6 is a schematic diagram of the second jet printing region.

As shown in FIG. 1 to FIG. 6, the jet printing process for protective layer of upper cover of lithium battery provided by the embodiment comprises the upper cover 1 of lithium battery to be jet printed.

The upper cover 1 end face of lithium battery has a width of W and a length of L, and the upper cover end face of lithium battery is provided with a non jet printing portion, and five non jet printing portions are spaced apart on the upper cover end face of lithium battery, namely positive electrode area 11, liquid injection hole area 12, central area 13, two-dimensional code area 14, and negative electrode area 15. In addition, it should be noted that the lithium battery is generally square shaped, with rectangular upper cover end face, and the upper, lower, left, and right sides of the upper cover end face of lithium battery (i.e. the edges where the faces meet each other) have a transition angle 16, especially the transition angles on the upper and lower sides are generally provided with circular angle transition and a certain arc surface structure, where insufficient jet printing may occur. Therefore, moderate boundary jet printing is required during jet printing to ensure sufficient jet printing at the corner transition.

The distance between the lower side of upper cover 1 end face and the lower side of non jet printing portion is H, and the distance between the upper side of upper cover end face of lithium battery and the upper side of non jet printing portion is also H, and it should be noted that if a plurality of non jet printing portions are different in the width, that is, the distance from the upper side of upper cover end face of lithium battery is different, then the non jet printing portion with the widest width shall prevail, that is, the distance between the lower side of upper cover end face of lithium battery and the lower side of the non jet printing portion with the widest width is H, and the distance between the upper side of upper cover end face of lithium battery and the upper side of the non jet printing portion with the widest width is also H.

Specifically comprising the following steps:

1) dividing the jet printing region on the upper cover 1 end face of lithium battery into a first jet printing region 17 and a second jet printing region 18, wherein the first jet printing region 17 is a square area between the lower side of the upper cover end face of lithium battery and the lower side of the non jet printing portion, the square area is L in length and H in width and, except for the first jet printing region 17, the remaining area of jet printing region 18 is the second jet printing region;

2) deploying a flying ink blocking plate 2, wherein the flying ink blocking plate 2 is provided with a W+0.1~1 mm wide and L long hollowed-out jet printing window 21 that is adapted in shape to the upper cover 1 end face of lithium battery, the flying ink blocking plate 2 is provided with a flying ink blocking block 22 corresponding to the non jet printing portion of upper cover 1 of lithium battery, the flying ink blocking block 22 protrudes from the lower side of jet printing window into the jet printing window 21, and maintains a gap 23, H+0.1~1 mm wide, with the upper side of jet printing window 21. The flying ink blocking plate 2 is also provided with five flying ink blocking blocks that are spaced apart corresponding to the non jet printing portions of the upper cover of lithium battery, namely the positive electrode flying ink blocking block, liquid injection hole flying ink blocking block, central flying ink blocking block, two-dimensional code flying ink blocking block, and negative electrode flying ink blocking block. A first jet printing window corresponding to the first jet printing region is formed between the upper side of jet printing window 21 and the upper edge of flying ink blocking block 22, the jet printing window is a square region with a length of L and a width of H+0.1~1 mm, and except for the first jet printing window, the remaining area of jet printing window is the second jet printing window;

It should be noted that the reason for designing the jet printing window with a width of W+0.1~1 mm is to provide a basis for sufficient jet printing at the corner transition on the upper and lower sides of the upper cover end face of lithium battery.

3) placing the flying ink blocking plate 2 above the upper cover 1 end face of lithium battery, and align the upper side of jet printing window with the lower side of non jet printing portion, so that the first jet printing window of flying ink blocking plate 2 corresponds to the first jet printing region 17 of upper cover 1 end face of lithium battery, and the first jet printing window is 0.1-1 mm wider than the first jet printing region 17, that is, the edge of ink blocking block 22 will be lower than the lower side (with a gap) of upper cover 1 end face of lithium battery, so that the rounded transition at the lower edge of upper cover end face of lithium battery can be fully jet printed (cross boundary jet printing can be performed), avoiding omission at the corner transition; on this basis, the first jet printing region on the upper cover end face of lithium battery is jet printed; the jet printing area of the first jet printing window should be slightly larger than the area of the first jet printing region, ensuring that the corner transition at lower side is fully jet printed.

4) after completing jet printing on the first jet printing region 17 of the upper cover 1 end face of lithium battery, move the ink blocking plate 2 so that the upper edge of ink blocking block aligns with the upper side of non jet printing portion, and the second jet printing window of ink blocking plate 2 corresponds to the second jet printing region 18 on the upper cover 1 end face of lithium battery, and the second jet printing window is 0.1-1 mm wider than the second jet printing region 18, that is, the upper side of jet printing window will be higher than the lower side (with a gap) of upper cover end face of lithium battery, so that the rounded transition at the upper edge of upper cover end face of lithium battery can be fully jet printed (cross boundary jet printing can be performed), avoiding omission at the corner transition; on this basis, the second jet printing region on the upper cover end face of lithium battery is jet printed; the jet printing area of the second jet printing window should be slightly larger than the area of the second jet printing region, ensuring that the corner transition at upper side is fully jet printed.

Specifically, in some embodiments, the non jet printing portion on the upper cover 1 end face of lithium battery is a flat non jet printing portion, a protruding non jet printing portion, or a recessed non jet printing portion.

Specifically, the flying ink blocking block 22 has a square structure. It should be noted that some non jet printing portions may not necessarily be square in shape, such as liquid injection holes, however, square ink blocking blocks basically meet the requirements of blocking flying ink at non jet printing portions of all shapes. However, when the non jet printing portion is not square in shape, or is slightly smaller than the width of flying ink blocking block of square structure, some areas at the edge of the non jet printing portion may not be well jet sprayed due to excessive obstruction. It is acceptable as long as the area of these non jet printing portions is controlled within a small range. Of course, preferably the shape of flying ink blocking block match that of the non jet printing portion.

Specifically, in step 2), the length of jet printing window is L+0.1~1 mm, and the length of the first jet printing window is L+0.1~1 mm; In step 3), a slight gap is provided between the left side of the first jet printing window and the left side of the first jet printing region, and a slight gap is provided between the right side of the first jet printing window and the right side of the first jet printing region and, on the overall, the first jet printing window is 0.1-1 mm longer than the first jet printing region; In step 4), a slight gap is provided on the left side of the second jet printing window relative to the left side of the second jet printing region, and a slight gap is provided on the right side of the second jet printing window relative to the right side of the second jet printing region and, on the overall, the second jet printing window is 0.1-1 mm longer than the second jet printing region. In some specific embodiments, it is not ruled out that the left and right sides of upper cover end face of lithium battery also have rounded transitions that also require sufficient jet printing, therefore, the length of jet printing window is additionally reserved by 0.1-1 mm, such that gaps is also formed on the left and right sides, providing a basis for sufficient jet printing.

The present invention is not limited to the above embodiments, and other jet printing processes for the protective layer of upper cover of lithium battery obtained by using the same or similar technical features as the above embodiments of the present invention are within the scope of protection of the present invention.

What is claimed is:

1. A jet printing process for protective layer of upper cover of lithium battery, including the upper cover of lithium battery to be jet printed, the upper cover end face of lithium battery has a width of W and a length of L, and the upper cover end face of lithium battery is provided with a non jet printing portion, the distance between the lower side of upper cover end face and the lower side of non jet printing portion is H, and the distance between the upper side of upper cover end face of lithium battery and the upper side of non jet printing portion is also H, comprising the following steps:
   1) dividing the jet printing region on the upper cover end face of lithium battery into a first jet printing region and a second jet printing region, wherein the first jet printing region is a square area between the lower side of the upper cover end face of lithium battery and the lower side of the non jet printing portion, the square area is L in length and H in width and, except for the first jet printing region, the remaining area of jet printing region is the second jet printing region;
   2) deploying a flying ink blocking plate, wherein the flying ink blocking plate is provided with a W+0.1~1 mm wide and L long hollowed-out jet printing window that is adapted in shape to the upper cover end face of lithium battery, the flying ink blocking plate is provided with a flying ink blocking block corresponding to the non jet printing portion of upper cover of lithium battery, the flying ink blocking block protrudes from the lower side of jet printing window into the jet printing window, and maintains a gap, H+0.1~1 mm wide, with the upper side of jet printing window, a first jet printing window corresponding to the first jet printing region is formed between the upper side of jet printing window and the upper edge of flying ink blocking block, the jet printing window is a square region with a length of L and a width of H+0.1~1 mm, and except for the first jet printing window, the remaining area of jet printing window is the second jet printing window;
   3) placing the flying ink blocking plate above the upper cover end face of lithium battery, and align the upper side of jet printing window with the lower side of non jet printing portion, so that the first jet printing window of flying ink blocking plate corresponds to the first jet printing region of upper cover end face of lithium battery, and the first jet printing window is 0.1-1 mm wider than the first jet printing region; the first jet printing region of the upper cover end face of lithium battery is jet printed;
   4) after completing jet printing on the first jet printing region of the upper cover end face of lithium battery, move the ink blocking plate so that the upper edge of ink blocking block aligns with the upper side of non jet printing portion, and the second jet printing window of ink blocking plate corresponds to the second jet printing region on the upper cover end face of lithium battery, and the second jet printing window is 0.1-1 mm wider than the second jet printing region; the second jet printing region of the upper cover end face of lithium battery is jet printed.

2. The jet printing process for protective layer of upper cover of lithium battery according to claim 1, wherein two or more non jet printing portions are spaced apart on the upper cover end face of lithium battery, and the flying ink blocking plate is also provided with two or more flying ink blocking blocks that are spaced apart corresponding to the non jet printing portions on the upper cover of lithium battery.

3. The jet printing process for protective layer of upper cover of lithium battery according to claim 2, wherein five non jet printing portions are spaced apart on the upper cover end face of lithium battery, namely positive electrode area, liquid injection hole area, central area, two-dimensional code area, and negative electrode area; the flying ink blocking plate is also provided with five flying ink blocking blocks that are spaced apart corresponding to the non jet printing portions of the upper cover of lithium battery, namely the positive electrode flying ink blocking block, liquid injection hole flying ink blocking block, central flying ink blocking block, two-dimensional code flying ink blocking block, and negative electrode flying ink blocking block.

4. The jet printing process for protective layer of upper cover of lithium battery according to claim 1, wherein the non jet printing portion on the upper cover end face of lithium battery is a flat non jet printing portion, a protruding non jet printing portion, or a recessed non jet printing portion.

5. The jet printing process for protective layer of upper cover of lithium battery according to claim 1, wherein the flying ink blocking block has a square structure.

6. The jet printing process for protective layer of upper cover of lithium battery according to claim 1, wherein in step 2), the length of jet printing window is L+0.1~1 mm, and the length of the first jet printing window is L+0.1~1 mm; In step 3), a slight gap is provided between the left side of the first jet printing window and the left side of the first jet printing region, and a slight gap is provided between the right side of the first jet printing window and the right side of the first jet printing region and, on the overall, the first jet printing window is 0.1-1 mm longer than the first jet printing region; In step 4), a slight gap is provided on the left side of the second jet printing window relative to the left side of the second jet printing region, and a slight gap is provided on the right side of the second jet printing window relative to the right side of the second jet printing region and, on the overall, the second jet printing window is 0.1-1 mm longer than the second jet printing region.

* * * * *